United States Patent [19]

Satoh et al.

[11] Patent Number: 4,769,804

[45] Date of Patent: Sep. 6, 1988

[54] OPTICAL DATA RECORDING AND REPRODUCING APPARATUS WITH ERASE FUNCTION DIAGNOSIS

[75] Inventors: Isao Satoh, Neyagawa; Makoto Ichinose, Sakai; Yoshihisa Fukushima, Osaka; Yuzuru Kuroki, Toyonaka; Yuji Takagi, Neyagawa, all of Japan

[73] Assignee: Matsushita Electric Industrial Co., Ltd., Osaka, Japan

[21] Appl. No.: 942,789

[22] Filed: Dec. 17, 1986

[30] Foreign Application Priority Data

Dec. 20, 1985 [JP] Japan .................................. 60-288528

[51] Int. Cl.[4] ................................................ G11B 7/00
[52] U.S. Cl. .......................................... 369/58; 369/54; 346/107 R; 360/57; 360/55; 360/60; 360/66
[58] Field of Search ............... 369/54, 58; 346/107 R; 360/55, 57, 60, 66

[56] References Cited

U.S. PATENT DOCUMENTS 4,622,564 11/1986 Kaku et al. ..................... 346/107 R
4,656,548 4/1987 Pfefferkorn ....................... 360/66 X Primary Examiner—Robert L. Richardson
Attorney, Agent, or Firm—Stevens, Davis, Miller & Mosher

[57] ABSTRACT

An optical recording and reproducing apparatus for recording and reproducing data in an optical disk is disclosed. The optical disk has a plurality of erase test sectors in tracks, in one of which the accumulated number of tests together with test data is written. The data read from the erase test sector is compared with the recorded data to effect an erase function diagnosis. If data comparison shows an non-coincidence or the accumulated number of tests exceeds a predetermined value, a new erase test sector is used. The fatigue of the recording medium caused by a defect of the medium or reduced erasing efficiency due to an increased number of erasures of the recording medium is checked by controlling the accumulated number, completely separately from the fault of erase function of the apparatus, thus improving the reliability of the erase function self-diagnosis. Upon detection of an error in the read data or when the accumulated number of tests exceeds a predetermined value, a marking signal is written in the data field of a defective sector, and the apparatus shift to a new erase test sector not yet marked for subsequent erase function self-diagnosis, thereby making possible erase function self-diagnosis without being affected by the fatigue of the recording medium.

9 Claims, 3 Drawing Sheets

OPTICAL DATA RECORDING AND REPRODUCING APPARATUS WITH ERASE FUNCTION DIAGNOSIS

BACKGROUND OF THE INVENTION

The present invention relates to an optical data recording and reproducing apparatus, or more in particular, to the diagnosis of the erase function of an apparatus for recording and reproducing data on an optical disk.

FIG. 3 shows a phase change between an amorphous state A and crystal state C of a phase-change recording medium of a conventional optical data recording and reproducing apparatus. The reflectivity in amorphous state A is smaller than that in crystal state C.

When a part of the recording medium is increased to a temperature near the melting point and annealed, a crystal state is obtained. When the part in crystal state C is locally increased in temperature to a level near the melting point followed by quenching, in contrast, the amorphous state A is attained.

FIG. 4(a) shows a configuration of a light beam for realizing conditions for temperature increase followed by quenching and temperature increase by annealing of the recording medium, and FIG. 4(b) a light distribution therefor. In FIG. 4, reference numeral 13 designates a guide track deposited with a recording layer by evaporation, numeral 14 an identifier (ID field) for a sector including such data as track address and sector address, numeral 15 a data field for recording data, numerals 16a, 16b gaps for absorbing time variations due to rotational variations of the disk, numeral 17 a recording and reproducing light beam in short diameter, numeral 19 a light intensity distribution thereof, numeral 18 an erase light beam in long diameter, and numeral 20 a light intensity distribution thereof. Two light beams, by creating annealing conditions with long diameter and quenching conditions with short diameter, perform the erasing and recording operations in one revolution of the disk, thus making what is called simultaneous erasing possible. FIG. 4(c) shows a waveform of a reproduction signal produced from the sector identifier (ID field) 14, data field 15, gap 16a, 16b formed on the guide track of the optical disk, with the reflectivity of the sector identifier (ID field) 14, gap 16a, 16b and data field 15 decreasing in that order.

FIG. 4(d) shows a write gate signal 102 for commanding the writing of the recording-reproducing light beam 17 set in a record mode and modulated with the write data, in the data field 15. FIG. 4(e) shows an erase gate signal 103 for controlling the time during which the erase light beam 18 is irradiated on the data field 15 of the guide track 13 with a predetermined intensity. Data is recorded in the data field 15 with the succeeding recording-reproducing light beam 17 while erasing the data field 15 with the preceding erase light beam 18 by enabling the write gate signal 102 and the erase gate signal 103. At the end of data recording, the write gate signal 102 and the erase gate signal 103 are both turned off.

In the above-mentioned configuration, however, the erase light beam 18 and the recording-reproducing light beam 17 are exactly aligned on the same guide track, and therefore it is necessary both to trace the guide track 13 with high accuracy and to irradiate the erase light beam 18 and the recording-reproducing light beam 17 on a sector to be erased with a predetermined erasing power and recording power respectively. For simultaneous erasing, it is important to determine by prior diagnosis that these operations are performed normally.

Diagnosis of the erase function is performed by rewriting a predetermined data in a predetermined sector and comparing the data read from an optical disc with original write data.

With the increase in the number of erasing and recording processes, the grooves of the guide track of the recording medium are deformed and the recording film is separated from the disk material due to the strain of the heat cycle. This phenomenon is called the fatigue of the recording medium and sharply deteriorates the bit error rate (BER) of the optical disk. Especially, a long burst that results poses the problem of inaccurate self-diagnosis of the erase function making it impossible to determine whether a burst error has been caused by the erasing failure due to an inferior erase function or the deterioration of the recording medium.

SUMMARY OF THE INVENTION

The object of the present invention is to provide an optical data recording and reproducing apparatus capable of self-diagnosis of the erase function without being affected by the deterioration of the recording medium.

According to the present invention, there is provided an optical data recording and reproducing apparatus wherein the number of accumulated erase function tests is written with test data in one of a plurality of erase test sectors of an optical disk, the data read from the erase test sector is compared with the recorded data, or an error is detected by an error correction detection code, so that when the data error detections or the accumulated tests exceeds a predetermined number, a new erase test sector is used in subsequent erase function diagnosis.

According to the present invention as configured above, the fatigue of the recording medium which is caused by a defect or a deteriorated erasing efficiency due to the increase in the number of erasing operations is controlled by the number of the accumulations of the erase function test. The fatigue of the recording medium and the fault of the erase function are completely separated from each other thereby improving the reliability of self-diagnosis of the erase function. Self-diagnosis of the erase function is accomplished in such a manner that test data together with the accumulated number of erase function tests are recorded in and read from an erase test sector of the erase self-diagnosis sector, and the recorded data is compared with the read data, for errors or an error is detected by an error correction detection code. When data error is detected or the accumulated number of tests exceeds a predetermined level, a marking signal is written in the data field of the particular sector, and a new erase test sector not yet marked is used for subsequent self-diagnosis of erase function, thereby making possible erase function self-diagnosis without being affected by the fatigue of the recording medium. Any erase test sector with a marking signal, which is detected by sequentially reading the erase test sectors in the beginning of the self-diagnosis, is not used.

DESCRIPTION OF THE PREFERRED EMBODIMENTS

Figure 1:
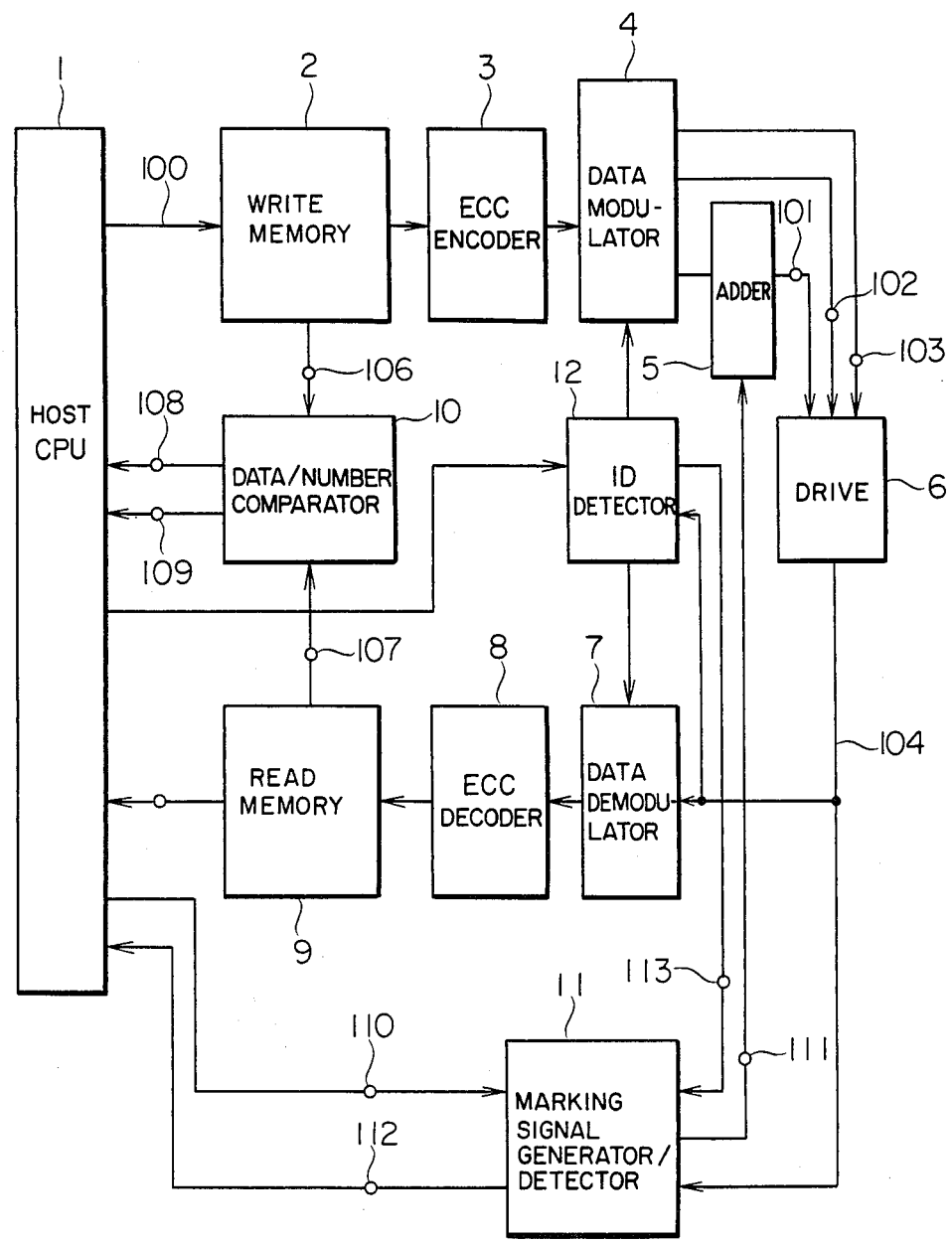
FIG. 1 is a block diagram showing an optical data recording and reproducing apparatus according to an embodiment of the present invention.

A block diagram of an optical data recording and reproducing apparatus according to an embodiment of the present invention is shown in FIG. 1. In FIG. 1, numeral 1 designates a host computer, numeral 2 a memory for writing data or test data and the accumulated number of tests, numeral 3 an ECC encoding section for generating an error correction code, numeral 4 a data modulator for modulating data with ECC code digitally, numeral 5 an adder for adding a marking signal 111, numeral 6 an optical disk drive, numeral 8 a data demodulator for demodulating a reproduction signal 104 digitally, numeral 8 an ECC decoder for correcting an error, and numeral 9 a read memory for storing data with the error corrected. Numeral 10 designates a comparator for comparing the written data of the write memory 2 with the read data of the read memory 9 and also the accumulated number of tests read with a set number of erasures. Numeral 11 designates a marking signal generator-detector for generating a marking signal to be recorded in an erase test sector and detecting a marked signal recorded. Numeral 100 designates an input data signal, numeral 101 a signal for writing data in the optical disk drive, numeral 102 a write gate signal, numeral 103 an erase gate signal, numeral 104 a reproduction signal from the optical disk drive, numeral 105 an output data signal, numeral 106 a record data signal, numeral 107 a read data signal, numeral 108 a data non-coincidence signal, numeral 109 a signal indicating a set number of erasures exceeded, numeral 110 a marking start signal, numeral 111 a marking signal, numeral 112 a marking detection signal, and numeral 113 a sector detection signal.

Explanation will be made now of the operation of an optical data recording and reproducing apparatus according to the present embodiment configured as above.

First, the host CPU 1 instructs the optical disk drive 6 to seek the erase function self-diagnosis track. The host CPU 1 identifies a predetermined erase test sector on the basis of the reproduction signal 104 from the optical disk drive 6. Then, the host CPU 1 reads out an erase test sector. The reproduction signal 104 from the erase test sector is demodulated at the data demodulator 7, so that an error in the data is corrected in the ECC decoder 8 and stored in the read memory 9. The data/number comparator 10 checks whether the accumulated number of tests on the read memory 9 has not exceeded a predetermined number of erasures. If a predetermined number of erasures is not exceeded by the accumulated number of tests thus read, the host CPU 1 applies a testing recording data to the input data signal 100 and loads the write memory 2. Then, the accumulated number of tests read is incremented, and the resulting number is written in the write memory 2 by the host CPU 1.

The error correction code is added to the data of the write memory 2 at the ECC encoder 3, and the resulting signal is digitally modulated at the data modulator 4. The write data signal 101 enables the write gate signal 102 and the erase gate signal 103 and applies them to the optical disk drive 6, thereby writing data by erasure or recording in the erase test sector.

Next, the host CPU 1 reads this erase test sector. The reproduction signal 104 from the erase test sector is demodulated at the data demodulator 7, and an error in the data is passed through the FCC decoder 8 without error correction and stored in the read memory 9. The data in the read memory 9 is compared with the write data of the write memory 2 at the data/number comparator 10. If the read data of the read memory 9 coincides with the write data of the write memory 2, the erase function self-diagnosis is normal. If there is no match, an error is detected, an error occurrence can also be known and the deterioration of the erase test sector can be determined from an error syndrome formed in the ECC decoder 8.

In the case where the accumulated number of tests thus read out is found to have exceeded a predetermined number of erasures, the data/number comparator 10 applies the set number of erasures over signal 109 to the host CPU 1. If the write data of the read memory 9 fails to coincide with the read data of the write memory 2, on the other hand, the data non-coincident signal 108 is applied to the host CPU 1, so that the host CPU 1 marks the erase test sector.

This marking indicates that the particular sector is unusable for an erase test. The host CPU 1 sets the ID data of the track address and the sector address of the erase test sector in the ID detector 12, and drives the marking signal generator detector 11 to start the marking with the marking start signal 110. Upon detection of the erase test sector by the ID detector 12, the sector detection signal 113 is applied to the marking signal generator detector 11, with the result that the marking signal 111 is applied to the adder 5. The marking signal 111, as a write data signal 101, is applied together with the write gate signal 102 and the erase gate signal 103 to the optical disk drive 6 and recorded in the data field section 15 of the erase test sector. The marking in the erase test sector is detected at the marking signal generator detector 11 on the basis of the reproduction signal 104 of the optical disk drive 6, and applied as a marking detection signal 112 to the host CPU 1. The host CPU 1 identifies the erase test sector by jumping to a sector not marked. The erase test sector of the erase function self-diagnosis track of the new optical disk is initialized before operation. Specifically, with the accumulated number of tests at 1, test data are recorded in all the erase test sectors. Then, data are read and compared with the write (recorded) data to check for any defect of the recording medium and write a marking signal in the non-coincident sector. By doing so, an erase test sector free of any defect of the recording medium is prepared.

A special signal easily distinguished from a burst signal, a pulse train signal, a gated RF signal or other data signal is used as a marking signal.

Figure 2:
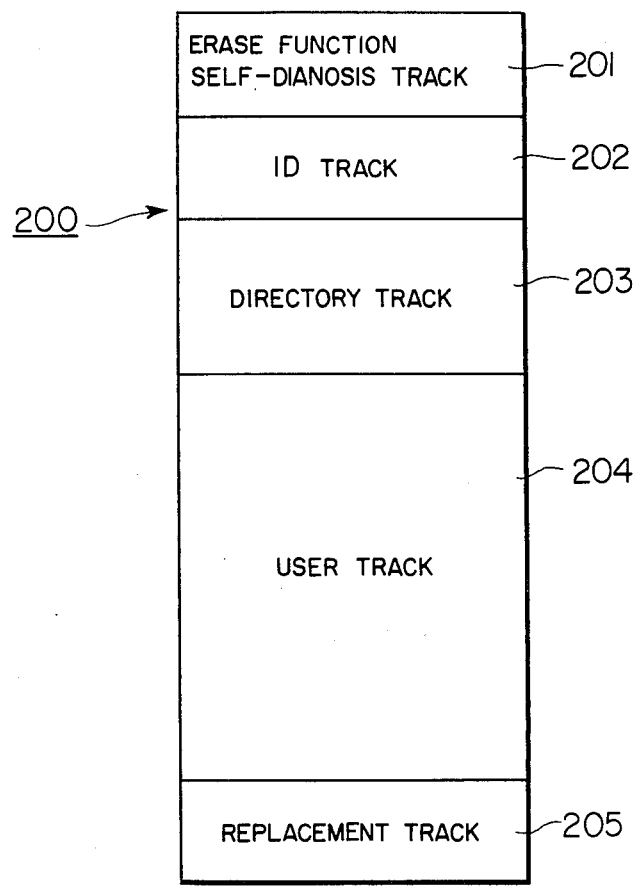
FIG. 2 is a diagram showing a track map according to an embodiment of an optical disk having an erase self-diagnosis track.
Figure 3:
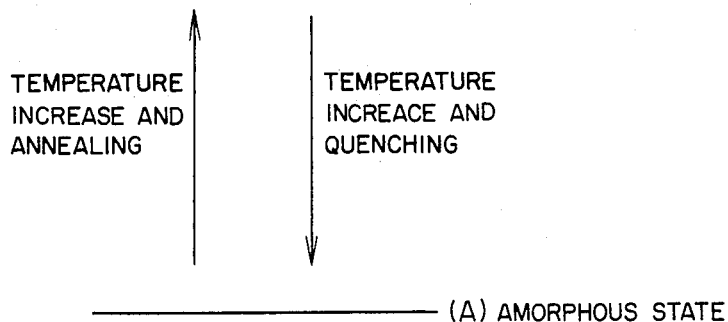
FIG. 3 shows phase changes between amorphous state A and crystal state C of a phase-change recording medium of a conventional optical data recording and reproducing apparatus.
Figure 4:
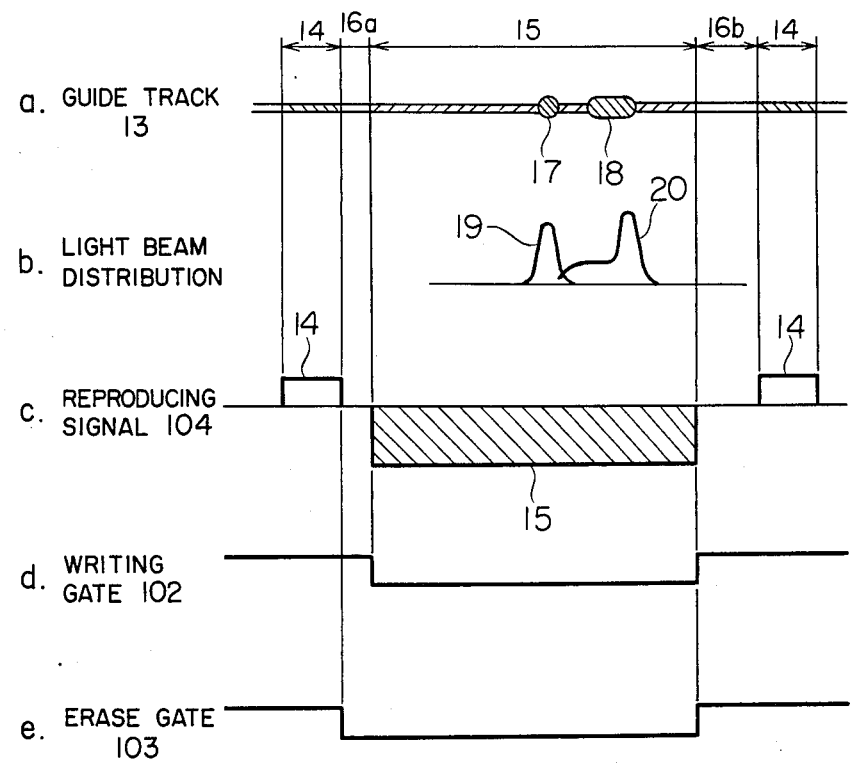
FIG. 4, consisting of a through e, is a diagram for explaining a configuration and distribution of a light beam and erasure and recording thereof for realizing the conditions for temperature increase followed by quenching and temperature increase followed by annealing of the recording medium.

FIG. 2 shows an embodiment of the track map of an optical disk 200 having an erase function self-diagnosis track. The optical disk includes an erase function self-diagnosis track 201 for self-diagnosing the erase function, the ID track 202 for recording the control ID data of the optical disk, and a replacement track 205 for replacing defective tracks 203 and user tracks 204 for recording user data.

As mentioned above, according to the present embodiment, the accumulated number of tests together with the test data are written in an erase test sector and the record data is compared with the read data thereby to perform self-diagnosis of the erase function. In the case of non-coincidence as the result of the comparison or when the accumulated number of tests exceeds a predetermined level, the data field of the particular sector is written with a marking signal. In this way, self-diagnosis of the erase function is accurately performed without being affected by the fatigue of the recording medium.

In the above-mentioned embodiment, if the erase test is conducted by track instead of by erase test sector, it is possible to diagnose the erase function including the tracking accuracy and the accuracy of alignment of the erase light beam 18 and the recording-reproducing light beam 17 on the guide track 13.

It will thus be understood from the foregoing description that according to the present invention, self-diagnosis of the erase function is made possible without being adversely affected by the fatigue of the recording medium, thereby resulting in a great practical advantage.

What is claimed is:

1. An optical data recording and reproducing apparatus comprising:
   an optical disk for recording and reproducing data having an optically detectable guide track divided into a plurality of sectors each including a sector identifier and a data field, said optical disk further including a plurality of erase test sectors;
   means for writing an accumulated number of erase function tests together with test data in a erase test sector;
   means for reading data from the erase test sector;
   means for detecting an error in the read data to thereby perform an erase function diagnosis;
   means for checking whether the accumulated number of erase function tests from the read data exceeds a predetermined value; and,
   means for causing said writing means to write an accumulated number of tests together with test data in a new erase test sector when an error is detected by said data error detecting means, or when the accumulated number of erase function tests exceeds said predetermined value.

2. An optical data recording and reproducing apparatus according to claim 1, further comprising means for writing a marking signal in the data field of a sector in which an error has been detected by the data error detecting means or the test number checking means has detected that the accumulated number of tests has exceeded said predetermined value, wherein erase function diagnosis subsequent to the writing of a marking signal is performed with a new erase test sector not yet marked by a said marking signal.

3. An optical data recording and reproducing apparatus according to claim 1, where said data error detecting means detects an erase test sector by checking for the presence or absence of a marking signal recorded from the forward end of an erase function self-diagnosis track.

4. An optical recording and reproducing apparatus according to claim 1, wherein said data error detecting means detects an error by comparing the original test data with read test data.

5. An optical data recording and reproducing apparatus according to claim 1, wherein said data write means adds an error correction detection code to the test data and the accumulated number of tests written in a erase test sector.

6. An optical data recording and reproducing apparatus according to claim 5, wherein said data error detection means detects an error exceeding an error correction limit from an error syndrome of the error correction detection code.

7. An optical data recording and reproducing apparatus according to claim 1, wherein said plurality of erase test sectors is written with the accumulated number 1 together with the test data at the beginning of operation of said optical disk.

8. An optical data recording and reproducing apparatus according to claim 1, wherein a value sufficiently smaller than the number of repetitive erasures of the recording medium is set as an accumulated number of tests in said accumulated test number check means.

9. An optical data recording and reproducing apparatus according to claim 1, wherein an erase function diagnosis is effected by track to determine whether an erase light beam and a recording-reproducing light beam are aligned on the same guide track.

* * * * *